(12) United States Patent
Grabowski et al.

(10) Patent No.: US 10,627,263 B2
(45) Date of Patent: Apr. 21, 2020

(54) SENSOR DEVICE

(71) Applicant: PHYSIK INSTRUMENTE (PI) GMBH & CO. KG, Karlsruhe (DE)

(72) Inventors: Axel Grabowski, Rutesheim (DE); Carolin Walenda, Karlsruhe (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 0 days.

(21) Appl. No.: 16/313,037

(22) PCT Filed: Jun. 29, 2017

(86) PCT No.: PCT/DE2017/100543
§ 371 (c)(1),
(2) Date: Dec. 23, 2018

(87) PCT Pub. No.: WO2018/001416
PCT Pub. Date: Jan. 4, 2018

(65) Prior Publication Data
US 2019/0234772 A1 Aug. 1, 2019

(30) Foreign Application Priority Data
Jul. 1, 2016 (DE) .................. 10 2016 112 062

(51) Int. Cl.
*G01D 5/34* (2006.01)
*G01D 5/347* (2006.01)
(Continued)

(52) U.S. Cl.
CPC ......... *G01D 5/34776* (2013.01); *G01D 5/145* (2013.01); *G01D 5/2454* (2013.01); *G01D 5/34792* (2013.01)

(58) Field of Classification Search
CPC ........... G01D 5/34776; G01D 5/34792; G01D 5/2454; G01D 5/145
See application file for complete search history.

(56) References Cited

U.S. PATENT DOCUMENTS 6,996,494 B2  2/2006 Braasch et al. ............... 702/150
7,808,650 B2  10/2010 Kon et al. ..................... 356/499
(Continued)

FOREIGN PATENT DOCUMENTS

DE  2811807 A1   9/1979
DE  19520299 A1  12/1996
(Continued)

OTHER PUBLICATIONS

Notification Concerning Transmittal of International Preliminary Report on Patentability (Chapter I of the Patent Cooperation Treaty), in English, dated Jan. 10, 2019, which was issued by the International Bureau of WIPO in Applicant's corresponding international PCT application having Serial No. PCT/DE2017/100543, filed on Jun. 29, 2017.

(Continued)

*Primary Examiner* — Tony Ko
(74) *Attorney, Agent, or Firm* — Bodner & O'Rourke, LLP; Gerald T. Bodner; Christian P. Bodner

(57) ABSTRACT

The invention relates to a sensor device and method for detecting measurement data relating to the absolute position of a linearly or rotationally moveable body, comprising an optical sensor system, wherein the optical sensor system uses exclusively zero-order rejections for the position measuring, and a magnetic sensor system which emits a second sensor output signal depending on the position to be determined of the moveable body, wherein the gauge of the optical sensor system and the gauge of the magnetic sensor system are integrated in a common gauge body, and a computer unit which is provided to obtain the first sensor output signal and the second sensor output signal and to generate a common sensor output signal from the first sensor output signal and the second sensor output signal, wherein the current period of the second sensor system can be (Continued)

Figure 1:
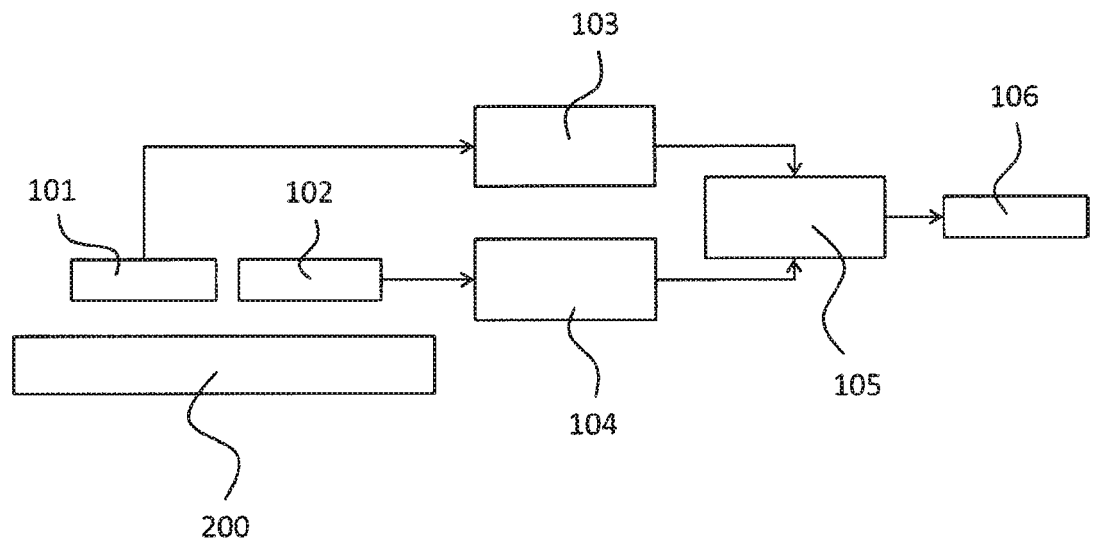

deduced from the first sensor output signal at every time, in order to calculate clear absolute position information based on the first and second sensor output signal.

16 Claims, 3 Drawing Sheets

(51) Int. Cl.
    *G01D 5/14*     (2006.01)
    *G01D 5/245*     (2006.01)

(56) References Cited

U.S. PATENT DOCUMENTS

| | | | |
|---|---|---|---|
| 8,570,621 B2 | 10/2013 | Braasch et al. | 358/488 |
| 2004/0022888 A1 | 2/2004 | Sreenivasan et al. | 425/174.4 |
| 2018/0180452 A1* | 6/2018 | Cook | G01D 5/34792 |

FOREIGN PATENT DOCUMENTS

| | | |
|---|---|---|
| DE | 10050392 A1 | 4/2002 |
| DE | 102008022027 A1 | 11/2009 |
| EP | 2020591 A2 | 2/2009 |
| FR | 2851650 A1 | 8/2004 |
| GB | 2230666 A | 10/1990 |
| JP | 2009036637 A | 2/2009 |

OTHER PUBLICATIONS

English translation of the International Preliminary Report on Patentability (Chapter I of the Patent Cooperation Treaty), dated Jan. 1, 2019, which was issued by the International Bureau of WIPO in Applicant's corresponding international PCT application having Serial No. PCT/DE2017/100543, filed on Jun. 29, 2017.

Written Opinion of the International Searching Authority, in English, dated Oct. 5, 2017, which was issued by the International Bureau of WIPO in Applicant's corresponding international PCT application having Serial No. PCT/DE2017/100543, filed on Jun. 29, 2017.

International Search Report, in English, dated Oct. 5, 2017, which was issued by the International Bureau of WIPO in Applicant's corresponding international PCT application having Serial No. PCT/DE2017/100543, filed on Jun. 29, 2017.

\* cited by examiner

SENSOR DEVICE

The invention relates to a sensor device for detecting measurement data relating to the absolute position of a linearly or rotationally moveable body according to claim 1. Moreover, the invention relates to a method for measuring the position of a linearly or rotationally moveable body using such a sensor device, according to claim 14.

In the field of encoder technology, a differentiation may be made between position measurement systems working in an incremental manner and position measurement systems working in an absolute manner. In the incremental systems, the user cannot read absolute position information. Consequently, a reference position has to be found first after restarting the system in order to put to zero or reference the incremental measurement system and to thereby obtain a start position (so-called homing). To this effect, reference marks on the gauge and corresponding sensor elements in the sensor head, which read the reference marks, are required.

In the absolute measurement systems, position information, which is always absolute, is generated by scanning a gauge, for which reason the absolute position information is immediately available even after restarting the system and homing is not necessary, which represents a clear advantage over incremental measurement systems.

In the field of magnetic absolute encoder technology, various methods are known to generate such absolute position information, for example, using the nonius principle, where several tracks are read and an absolute position can be calculated from the phase difference of the various tracks.

The systems measuring in a magnetically absolute manner usually have a comparatively simple structure and can therefore be manufactured in a cost-effective manner at relatively low expenditure. They are available on the market as simple and compact integrated circuits. An essential advantage of these systems is their resistance to contamination. This, however, is countered by the disadvantage that the resolution of such systems is delimited in a system-dependent manner to a magnitude in the range of typically several 100 nm.

In contrast, systems for absolute measurement that are based on optical principles, offer the advantage of permitting higher resolutions which are in the range of significantly <10 nm. This is in particular possible due to the smaller period of the gauges as compared to the magnetic systems. The optically measuring systems, however, are more complex to produce and thus more expensive than the magnetically measuring absolute systems. The absolute optical measurement is also more complex than with magnetic absolute sensors; it is performed, for example, by reading a pseudo random code on the corresponding gauge.

From DE 19520299 A1, a sensor device is known, in which two separate sensor systems operating on different physical principles are used for measuring the position of a moveable body. The signals from these two sensor systems are complemented by a processing system which evaluates the data of both sensor systems and combines them into a common position value. DE 19520299 A1 specifically describes the use of an angle measuring device which detects an absolute signal of a rotation by means of a magnet comprised of two poles in combination with a detection element in the form of a Hall sensor. On this occasion, the magnetic detection element delivers an analog sinusoidal signal over the rotation angle range of 360°. The angle signal, however, is only clear over a range of application of 120°, and a linearization of the angle signal is necessary in addition.

The magnetic detection element is combined with an incremental optical sensor system comprised of an incremental gauge having one or more reference marks along the measuring section. The reference mark or reference marks is or are necessary for the basic function of the system.

In DE 19520299 A1 there is only a short note but neither described in detail nor evidenced by an exemplary embodiment that the basic structure of the combination of different sensor systems would also be applicable for linear measuring systems. By means of the sensor device described there, it is, however, not possible to realize a clear (absolute) measurement of an angular range of 360° (so-called single turn). Moreover, the sensor device described there in general does not allow a usable absolute position signal to be generated over longer measuring sections.

A further disadvantage of the sensor device according to DE 19520299 A1 is that the sensor device requires a relatively large assembly space or a relatively large assembly height and is thus not suitable for applications where only a small assembly dimension is present for the sensor device.

From JP 2009036637 A, a measurement system is known, which is comprised of a composite gauge featuring both a magnetic and an optical coding. The optical coding is realized as a diffraction grating in this system. According to general technical understanding, this means that the structure of the diffraction grating has a periodicity of less than 10 µm. In the corresponding explanation, a periodicity of 4 µm is correspondingly mentioned. JP 2009036637 A furthermore describes a realization in which the code of the magnetic track is an absolute code. An absolute position is then calculated based on the data of the magnetic and the optical structure.

To ensure that this method works, it is necessary to mutually calculate the absolute position information of the magnetic track and the data of the optical track such that the signal of the magnetic track can always be allocated clearly to the related period of the optical diffraction grating. In this respect, it is taken as a basis in JP 2009036637 A that the diffraction gratings have perfect periodicity. With regard to the periodicity of the magnetic track, JP 2009036637 A indicates an explicit value of 1000 µm so that the periodicity of the magnetic track is substantially larger than the periodicity of the optical track.

However, magnetic gauges—due to their manufacturing process—can only be manufactured according to the general technical understanding with accuracies in the range of about ±10 µm, with JP 2009036637 A saying nothing with respect to an explicit value. It is precisely this relatively high inaccuracy of the magnetic gauge which prevents the magnetic scale and the optical scale from being able to always be in a constant and determined periodic dependency relationship which is indispensable for determining an absolute position value. Thus, it is no longer possible to create an absolute sensor system with clear position information by combining the data of the two gauges. JP 2009036637 A does not deal with the question of how the position information of both of the sensor systems could be synchronized with one another.

From GB 2230666 A, a method is known, in which an optical gauge is used having several tracks of different periodicity. Absolute position information can be calculated due to the different phase information of the tracks in relation to one another. For calculating this absolute position information, it is necessary to combine the information from all of the tracks at the same time. A disadvantage of this method is the fact that the position calculation based on all of the photodiodes is performed simultaneously. Thus, the noise components of the photodiodes of the individual tracks will add up as well. Moreover, the errors occurring in the formation of the tracks to be scanned will add up in the overall signal.

It is therefore a task of the invention to provide a sensor device which overcomes the above-mentioned problems of known sensor devices. It is in particular a task of the invention to provide a compact sensor device which is able to deliver at any time clear, absolute and highly accurate position information over a linear measurement section of arbitrary length or—in the case of measuring a rotation angle—over the entire angular range of 360°, and which can be realized to be compact and of a small assembly space.

The task is solved by a sensor device according to claim 1. The subsequent dependent claims represent at least appropriate further developments.

Accordingly, a sensor device is taken as a basis which is capable of measuring the position of a linearly or rotationally movable body in an absolute manner. For this purpose, the sensor device comprises an optical sensor system having a measuring unit and a gauge cooperating with the measuring unit, wherein the optical sensor system operates in reflectance for the position measuring and uses exclusively zero-order reflections, and the optical sensor system generates a first sensor output signal depending on the position to be determined of the moveable body.

The sensor device furthermore comprises a magnetic sensor system having a measuring unit and a gauge cooperating with the measuring unit which generates a second sensor output signal depending on the position to be determined of the moveable body. The resolution of the magnetic sensor system is in this case lower than the resolution of the optical sensor system.

The gauge of the optical sensor system and the gauge of the magnetic sensor system are arranged in a common gauge body, wherein the measuring unit of the optical sensor system and the measuring unit of the magnetic sensor system are facing the surface of the gauge body on which surface the gauge of the optical sensor system and/or the gauge of the magnetic sensor system are/is arranged, and which defines a common measurement surface. Due to the corresponding arrangement of the two gauges, a very compact and assembly space-saving structure of the sensor device is achieved. In particular, a sensor system of a very flat design can thus be realized.

The term 'common measurement surface' used above should not necessarily be understood such that the data or pieces of information to be detected by the measuring unit are present exclusively in the plane of the common measurement surface. Neither should this term be understood such that the two gauges are necessarily arranged in the same plane, namely the corresponding surface of the gauge body. Rather, the common measurement surface, as viewed physically, is defined by the gauge of the optical sensor system, since a precise spatial delineation is possible in this respect. Usually, the optical gauge is arranged at or coincides with the surface of the gauge body. With regard to the gauge of the magnetic sensor system, such a spatial delineation is hardly possible since the magnetic field lines can only be delineated at high technical expenditure. Usually, the gauge of the magnetic sensor system is not arranged in the same plane as the gauge of the optical sensor system, which, however, is not necessary, since the magnetic field lines are more far-reaching than the spatial extension of the magnetic gauge. However, it is conceivable for the optical gauge and the magnetic gauge to be arranged in the same plane so that the surface of the gauge body facing the two measuring units represents the common measurement surface at the same time.

The sensor device moreover comprises a computing unit which is provided to obtain the first or optical sensor output signal and the second or magnetic sensor output signal in order to calculate position information from both of the sensor output signals, wherein the current period of the optical sensor system can be deduced from the second or magnetic sensor output signal at any time so that a clear absolute position information can be calculated by the computing unit based on the first and the second sensor output signal. For this clear allocation of the magnetic sensor output signal to the current period of the optical sensor system, an accuracy of the magnetic sensor system is essential which is less than the signal period of the optical sensor system. This means that the maximum deviation of the position information of the magnetic sensor system at one position is less than the signal period of the optical sensor system.

It may be advantageous for the gauge of the optical sensor system to be arranged in the plane of the measurement surface. Likewise, it may be advantageous for the magnetic gauge to be arranged spaced from the measurement surface in a direction facing away from the measuring unit of the optical sensor system and the measuring unit of the magnetic sensor system.

According to the advantageous embodiment described above, the physical surface of the magnetic gauge is not in the same plane as the physical surface of the gauge of the optical sensor system. Specifically, the physical surface of the magnetic system is below the physical surface of the gauge of the optical sensor system. Even so this structure results in a single or common measurement surface corresponding to the physical surface of the gauge of the optical sensor system. This is possible because the magnetic field of the magnetic gauge penetrates the material situated in between the surface of the magnetic gauge and the common measurement surface and exits at the common measurement surface such that the corresponding magnetic field can be detected by means of a corresponding magnetic sensor of the measuring unit.

It may also be advantageous for the measurement signals of the magnetic sensor system to be available in another digital data format than the measurement signals of the optical sensor system. As compared to DE 19520299 A1, the data of the magnetic sensor system are not available as incremental data but already as an absolute data stream, giving the following advantages: (1) an absolute position measurement is possible at any time, which will be refined by the second (incremental) system; (ii) absolute position data is available on the entire measurement section even if the more sensitive (optical) system fails; (iii) the data format of the absolute system is safer (e.g. CRC (cyclic redundancy check), error bit).

Moreover, it may be advantageous for the geometric dimension of the gauge of the optical sensor system in the direction of its largest extension to correspond essentially to the geometric dimension of the gauge of the magnetic sensor system in the direction of its largest extension. In other words, the gauge of the first sensor system is about the same length as the gauge of the second sensor system.

Further, it may be advantageous for the optical sensor system to be an incremental sensor system and the magnetic sensor system to be an absolute measuring sensor system.

In addition, it may be advantageous for the resolution of the sensor device to be identical to the higher resolution of the optical sensor system. Thus, the resolution of the sensor device is not limited by the lower resolution of the magnetic sensor system.

It may be beneficial for the gauge of the optical sensor system to have a lattice structure with between 3 and 20 lines per mm, which corresponds to a period of between 330 μm and 50 μm. In this case, it may be advantageous for the lattice structure to be manufactured by means of etching or by laser.

Likewise, it may be beneficial for the thermal expansion coefficient of the material for the gauge of the optical sensor system to essentially correspond to the thermal expansion coefficient of the material for the gauge of the magnetic sensor system. The term 'essentially' as used above in this case describes a deviation from the absolute identity of +/−10%. This ensures that the two gauges will not or only negligibly displace relative to one another at a change in temperature. Thus, a precise and reliable position measuring is possible even in case of a change in temperature. This ensures in particular that despite the change in temperate, a clear allocation of the periods in relation to one another is still possible.

Moreover, it may be beneficial for the total resolution of the sensor device in a linear position measurement to be better than 100 nm and in a rotation position measurement better than 100 μrad.

Furthermore, it may be beneficial for the measuring unit of the first sensor system and/or the measuring unit of the second sensor system to be implemented as integrated circuit(s). This allows the assembly of the sensor device to be even more compact and space-saving.

In addition, the invention relates to a method for identifying the position of a linearly or rotationally moveable body by using a sensor device described above. The method according to the invention is in particular characterized in that the signals of both of the sensor systems are compared with each other in the computing unit in order to achieve increased redundancy and to generate a warning in the event of a fault. In this case, it is particularly advantageous for the total resolution of the sensor device to correspond to the resolution of the sensor system having higher resolution.

In a preferred embodiment of the invention, a magnetically coded gauge is used via which—by using several magnetic field sensors and in combination with an incremental optical sensor system—absolute position information may be generated at any position along the gauge over a measurement section of arbitrary length or angles. Due to the absolute position information along the incremental track being immediately available at any time, a reference mark is not required. Optionally, the use of a reference mark would be possible in order to achieve additional redundancy in the system (for example, in the event of the absolute system failing), but is not necessary for the basic function of the sensor device.

The use of a gauge body, in which the gauge of the optical sensor system and at the same time the gauge of the magnetic sensor system are integrated, achieves that the pieces of position information for both sensor systems are unified in one place, whereby not only assembly space is saved but environmental effects due to thermal expansion, for example, are eliminated to the greatest possible extent by the specific arrangement. In this case, it is also conceivable for the optical gauge to be realized integrally or in one piece with the magnetic gauge, with the corresponding lattice structure of the optical gauge being incorporated in the material of the magnetic gauge.

The sensor device of the present invention thus may be employed both in a reflecting and a transmitting method. The reflecting method, however, enables a significantly more compact assembly space.

The position signals of the absolute or magnetic sensor system preferentially are available in another digital data format than the position signals of the incremental or optical sensor system, wherein the combination thereof in the computing unit requires a special algorithm for obtaining a common absolute position signal of high resolution.

As stated above, the sensor device preferentially comprises an incremental optical sensor system and an absolute measuring magnetic sensor system. The magnetic sensor system measures the position data, for example by means of the nonius principle, in which several magnetic tracks having different periods are scanned and an absolute position is calculated from the phase difference between the magnetic tracks. Other absolute measurement principles are likewise conceivable. The magnetic sensor system measures the absolute position values in this case at a restricted resolution. This restriction is caused by the circumstance that the magnetic sensors of the corresponding measuring unit, which scan the magnetic gauge, typically are positioned at a distance above the gauge, which is half of the pole width. Since the distance of the magnetic sensors in relation to the gauge typically is selected not to be below 500 μm, typical minimal pole widths have a magnitude of 1 mm which results in the typical noise limitation to be in the order of 100 nm.

The optical incremental sensor of the measuring unit of the optical sensor system has a higher resolution since smaller gauge periods can be selected in optical sensors.

The magnetic sensors and the optical sensor may be arranged, for example, on a common carrier which realizes the optimum operating distances of the sensors in relation to the gauge to be scanned.

The sensor device according to the invention can be used both for measuring an absolute position value in a linear application and for measuring an absolute position value in a rotational application. In case of a rotational application, an absolute measurement over a complete rotation of 360° is possible (so-called single turn measurement).

The combination of the magnetic absolute sensor and the optical incremental sensor enables the advantages of both sensor principles, namely the relatively simple structure of the magnetic sensor, which, it is true, is limited in the resolution but renders absolute position values, to be combined with the high resolution of an optical sensor which, however, does not provide absolute position information.

For processing the data in the computing unit, it is advantageous for the position information of both sensor systems to be available in digital form. In the simplest case, the information of the absolute measuring sensor system is already available as digital position information without any corresponding preparation. If this is not the case, absolute digital position information will be generated from the output signals of the sensor system in an appropriate circuit. These pieces of position information may then be retrieved upon request by a higher-order instance.

The optical incremental sensor typically provides analog output signals. These analog output signals first are prepared in an interpolation circuit and converted into a digital data stream which can also be read by a higher-order instance.

At least the two modes or processes are possible for calculating the position information:

In a first mode or process, the sensor device calculates continuously position information at its own clock. The calculation of the position information includes reading in the data of both of the sensor systems synchronously and computationally converting these two data streams into a new absolute data stream. This newly generated position information of higher resolution is held ready for a subsequent unit reading out the position information. For the subsequent unit to be able to retrieve the new position information at any time, the calculation process of the new position information of the two new data streams is asynchronous to the request from the subsequent unit.

In a second mode or process, the position information is not calculated until a request is received from the unit reading out the position information. The procedure is then as follows:

the reading unit sends a request,
the computing unit synchronously requests the pieces of position information from the two sensor systems,
the computing unit calculates new position information from the two pieces of position information,
the new position information is sent back to the reading unit.

The temporal delay until the position information is provided can in this case be compensated via digital sensor protocols such as e.g. the BiSS protocol.

The computing unit combining the data streams of the two sensor systems may be realized inter alia as a CPU (central processing unit), an MCU (micro controlled unit), an FPGA (field programmable gate array) or an ASIC (application specific integrated circuit).

As already stated further above, the magnetic gauge for the magnetic sensor and the optical gauge for the optical sensor are integrated in a common gauge body. Preferably, the magnetic gauge is arranged to be concealed in the gauge body and, by way of example, is arranged behind the optical gauge relative to a direction facing away from the measuring units of the sensor systems. To the upper side of the gauge body or such a hybrid or integral gauge, a structure, preferably a lattice structure, is applied which can be detected by the sensor of the optical sensor system, and which includes the preferably incremental position information for the optical sensor system. The structure is in this case preferentially incorporated in a material which has the same thermal expansion coefficient as the carrier structure in which the magnetic material for the magnetic gauge is situated.

The sensor unit according to the invention can be operated such that the signals of both sensor systems can be retrieved simultaneously, individually and in combination. A possible case of application would be redundant operation of both sensor systems so that the position information of one of the systems can be accessed when needed if the corresponding other sensor system fails or is switched off. The magnetic absolute measuring sensor system is relatively robust and resistant to contamination, whereby the reliability of its position information is relatively high as compared to the optical sensor system. By combining the data from both of the sensor systems, redundancy can be created, within which both systems mutually monitor each other.

In contrast to the teaching of GB 2230666 A, the information of all of the tracks is not required simultaneously for the determination of the position by means of the sensor unit according to the invention, but rather the measurement system of less high resolution and lower accuracy is only used to determine the period of the measurement system of higher resolution at any point in time in a clear manner; it is thus only used to be able to calculate the absolute position information clearly back to the optical period. Therefore, in the sensor unit according to the invention, the requirements for the mutual relation of the tracks of the systems are lower than in the sensor unit described in GB 2230666 A. Accordingly, the accuracy and the resolution for the overall system is determined by the system of higher resolution and independent of the system of less high resolution. The only restriction is the fact that a clear allocation of the period must be possible.

In contrast to EP 2020591 A2, the present invention ensures that the information of the two information carriers can be correlated with one another. Simply joining the position information of the two sensor systems (magnetic absolute and optical incremental) without synchronizing the position data in relation to one another will lead to jumps and deviations in the combined signal.

In order to prevent this, the data must be able to be synchronized to one another or it must be ensured by the mutual relation of the tracks that the clear allocation of the periodicities of the tracks to one another is possible. As a numerical example, a pole to pole distance of 1.6 mm and correspondingly a periodicity of the signal of 3.2 mm should be taken as a basis for a magnetic absolute gauge. On the corresponding gauge having a signal period of 3.2 mm, an optical scale should be applied. In the sensor system with the optical gauge, the 6 sigma noise will be in the order of around 5 µm (at a high system bandwidth). The accuracy of the magnetic gauge will be in the order of 10 µm/m. The portion of non-linearity of the optical gauge will likewise be in the order of around 5 µm. An optimum thermal design using appropriate materials allows the system to be built up such that the differences in the thermal expansion of the two tracks are low in relation to one another. In total, the accuracy of the magnetic system thus will be in the order of around 20 µm. In order for the position information obtained from the magnetic system to allow a clear allocation to the optical system, the period of the optical sensor system accordingly may not be selected to be less than 2×20 µm=40 µm in order to guarantee the clear allocation over the entire range of operation parameters.

Furthermore, it is possible to read out the position information of both sensor systems at the same time individually. This manner of use has the advantage that—if data is no longer supplied from the optical sensor system due to contamination, for example,—the position data of the absolute magnetic sensor system may nevertheless be used, however, at a lower resolution. If the data of the optical sensor system is available again at a later point in time, the absolute position measurement together with the high resolution of the optical sensor system would be available again. A similar case of application would be the switching off and need-based switching on of the optical sensor system at a later point in time for the purpose of energy saving.

In addition, it is possible for the signals of both sensor systems to be used in combination at the same time and as a single signal in the event that position-dependent trigger signals are necessary or helpful for the synchronization. In such a case of application, both the absolute position signal of high resolution resulting from the combined calculation of the data of both sensor parts and the signal of the incremental sensor would be used, which is available independently and synchronously in analog (sin/cos) as well as digital (A/N) form.

The description of various embodiments of the sensor device according to the invention or of parts of the sensor device according to the invention will be given in the following with regard to the corresponding Figures, wherein identical reference numerals are related to identical parts in the different Figures.

Figure 2:
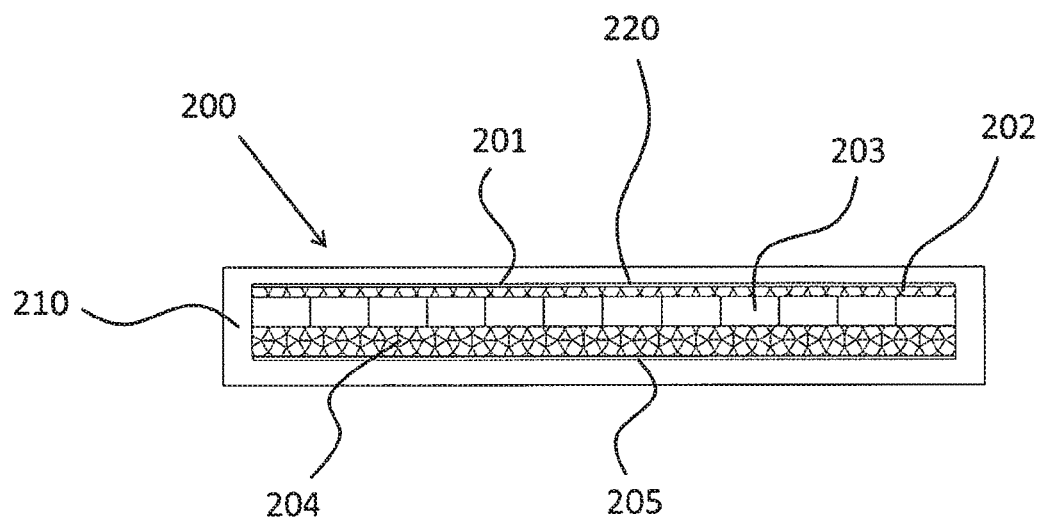
Figure 3:
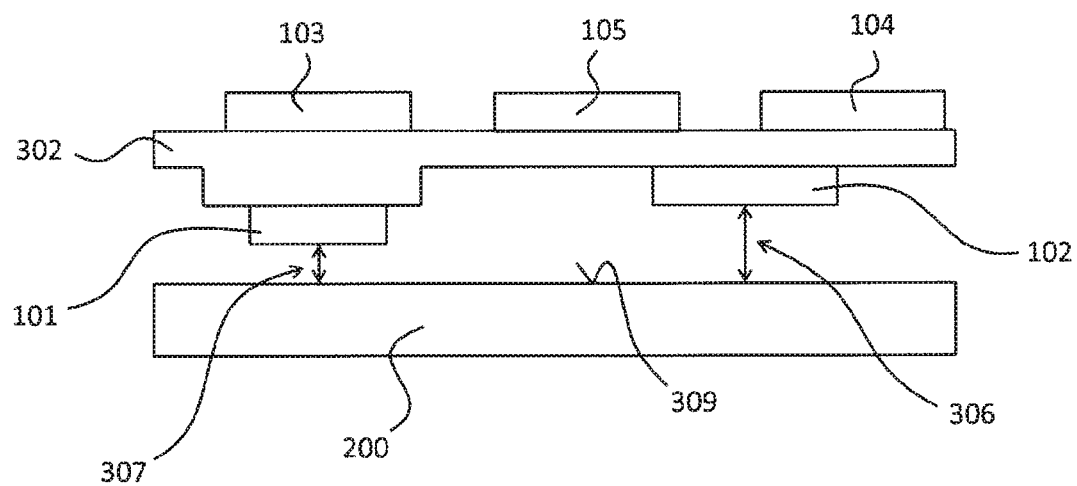
Figure 4:
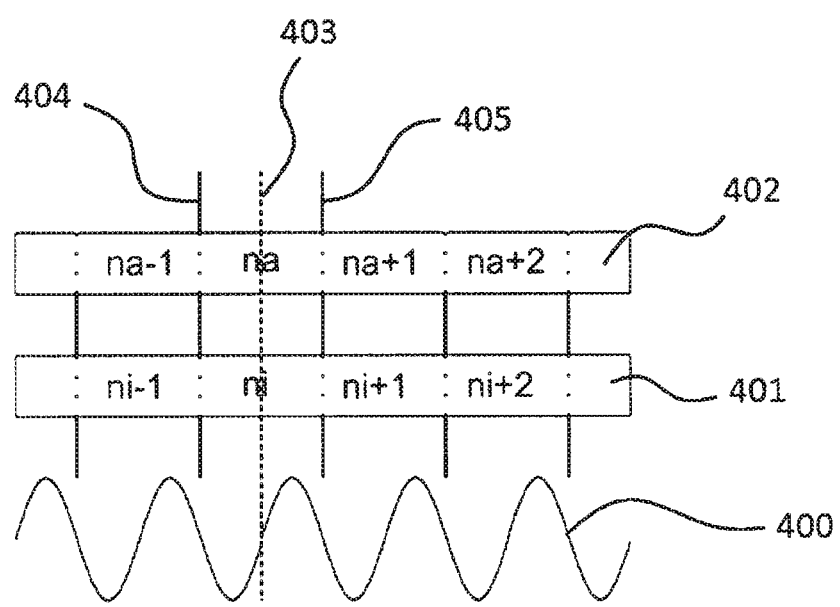
Figure 5:
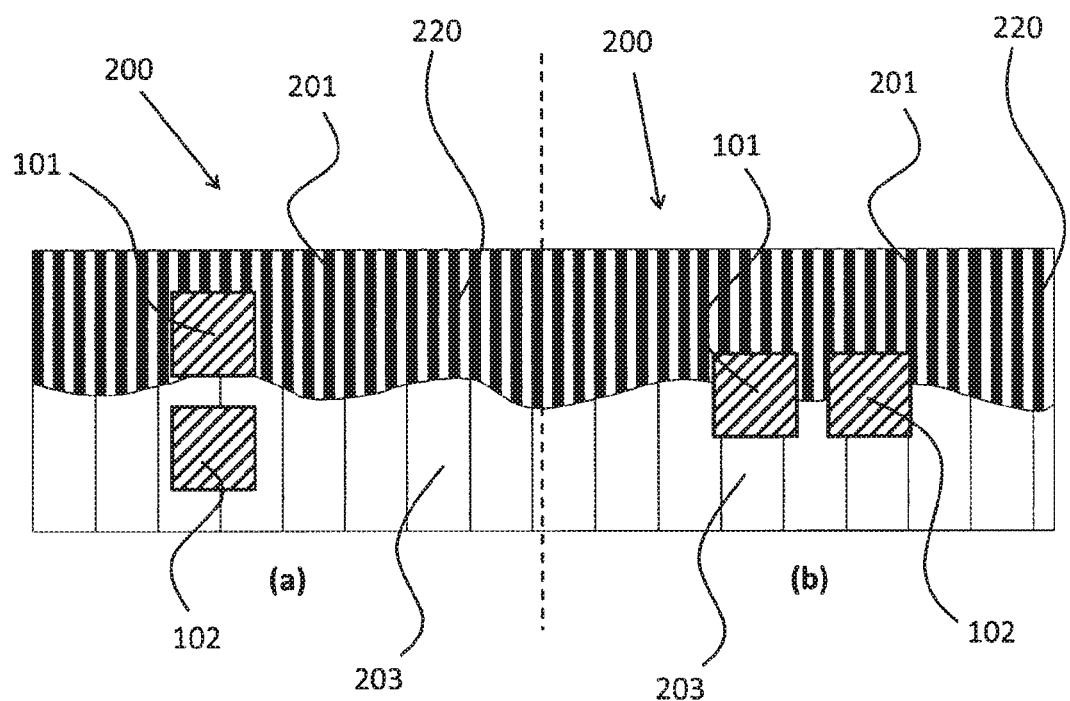

Shown are in:

FIG. 1: a schematic representation of the data flow within a sensor device according to the invention FIG. 2: an embodiment of the arrangement of the gauges of a sensor device according to the invention FIG. 3: a schematic representation of an embodiment of the sensor device according to the invention FIG. 4: a schematic representation in terms of the synchronization of the streams of position data of both sensor systems FIG. 5: portions (a) and (b): different embodiments with respect to the arrangement of the measuring units of the sensor systems as compared to the associated gauge of a sensor device according to the invention FIG. 1 shows a schematic representation of the data flow within a sensor device according to the invention. The measuring unit 101 of a magnetic and absolute measuring sensor system and the measuring unit 102 of an optical and incremental measuring sensor system scan the gauge 200 which comprises an optically scannable gauge and a magnetically scannable gauge and thus represents a hybrid gauge. The measuring unit 101 scans in this case the magnetic structure of the hybrid gauge 200. In the course of this, an absolute position is determined from the obtained information in a processing unit 103. The position information is in this case provided as digital information via a digital interface. The measuring units 101 and 102 may also be combined in a single integrated circuit. The measuring unit 102 scans the surface or the optical gauge of the hybrid gauge 200 optically in reflection. The corresponding position information are converted into digital position information in an appropriate circuit 104, e.g. an interpolation circuit, and provided via a digital interface. The digital position signals or the position information are or is then made available to a computing unit 105 for further data processing. The computing unit 105 may in this case be an MCU, an FPGA (field programmable gate array), an ASIC (application specific integrated circuit) or the like, which calculates a new absolute position value by combining the position information of the two sensor systems, and provides it as a data stream 106, which may follow a digital protocol for position information (e.g. SSI, BiSS or the like), to a controller not shown in FIG. 1. The measuring units 101 and 102, the processing unit 103, the circuit 104 and the computing unit 105 may be installed in any combination in integrated circuits.

FIG. 2 shows a schematic representation for a possible embodiment in terms of the arrangement of the gauges of the sensor device according to the invention in the form of a combined or hybrid gauge 200 for the magnetic and optical measuring unit of the respective sensor system. The hybrid gauge 200 comprises a common gauge body 210 in which a magnetic gauge 203 is arranged between a material layer 202 and a carrier layer 204. Both the carrier layer 204 and the material layer 202 are comprised of non-magnetic stainless steel. To the outside, the material layer 202 is adjacent to a surface layer 201, in which the optical gauge 220 is integrated or incorporated in the form of a lattice structure.

By applying an external magnetic field, the magnetic gauge 203 may be magnetized such that the magnetic structure includes numerous North and South poles in a continuous and alternate sequence, which can be evaluated by the measuring unit of the magnetic sensor system. The magnetic field of the magnetic gauge is large enough to penetrate the material layer 202 lying above it and also the surface layer 201 and the optical gauge 220, respectively, and to protrude far beyond to be able to be detected by the measuring unit of the magnetic sensor system facing yet being spaced from the surface layer 201. Furthermore, the magnetization is configured such that the detection by means of the sensor of the magnetic sensor system enables an absolute position to be calculated (e.g. via the nonius principle with several tracks arranged side by side on the gauge).

The thermal expansion coefficient of the carrier layer 204 essentially corresponds to the thermal expansion coefficient of the magnetic gauge 203. The material layer 202 has an identical thermal expansion coefficient to the material of the carrier layer, and the thermal expansion coefficient of the surface layer 201 corresponds essentially also to the thermal expansion coefficient of the material layer 202 or the carrier layer 204. Upon a change in temperature, the hybrid gauge will thus expand or contract uniformly, and thermal tensions within the hybrid gauge will not occur as a result.

The surface layer 201 has a defined structuring defining the optical gauge 220, and the measuring unit of the optical sensor system 102 is able to generate incremental position data from this structuring. The structuring may be performed by different methods, by way of example by a laser treatment of the surface or by an etching method.

The thermally adapted expansion behavior of the carrier layer 204, the magnetic gauge 203, the material layer 202 and the surface layer 201 ensure that, even upon a change in temperature to which the sensor unit or the gauge body is subjected, the mutual relation of the dimensional structures will always remain the same.

It is conceivable for the magnetic gauge and the optical gauge to be mounted side by side so that their surfaces lie in a common or equal plane.

To the underside of the hybrid gauge, an adhesive material 205 (e.g. double-sided adhesive tape) is applied which enables the gauge to be attached to a structure of the gauge body 210 with its underside.

FIG. 3 schematically shows one embodiment of the sensor device according to the invention. The sensor device comprises the hybrid gauge 200 including a magnetic gauge and an optical gauge, a magnetic sensor system having a corresponding measuring unit 101 cooperating with the magnetic gauge of the hybrid gauge 200, and an optical sensor system having a corresponding measuring unit 102 cooperating with the optical gauge of the hybrid gauge.

The distance 307 of the measuring unit 101 from the measurement surface 309 corresponds approximately to half the period of the magnetization of the magnetic gauge. There is also an optimum range for the distance 306 of the optical measuring distance 102 from the common measurement surface 309. The carrier element 302, where the measuring units 101 and 102 are arranged, in this case enables the optimum operating distance to be set.

The data of the optical measuring unit 102 or the optical sensor are converted into digital position signals in a circuit 104 in the form of an interpolation chip. The same applies to the signals of the magnetic measuring unit or the magnetic sensor 102, the signals of which are further processed in the processing unit 103. It is conceivable for the magnetic measuring unit 101 and the associated processing unit 103 or the optical measuring unit 102 and the associated interpolation chip 102 to be combined in a separate ASIC. The data streams from the two sensors are subsequently forwarded to the computing unit 105, for example a DSP (digital signal processor), an MCU or an FPGA, and further processed.

A possible processing of the data streams in the computing unit 105 will be described in the following: the digital output data stream from a magnetic absolute position sensor based on the nonius principle has a length of 23 bits, for example. From this output data stream, and at a sensor period of the nonius base of 3200 µm and an interpolation of the nonius input data with 14 bits, the rear 9 bits will then correspond to a path of 100 µm. One bit of this data stream corresponds to 195.31 nm.

In an optical incremental sensor having a period of 100 µm and an interpolation rate of the analog signals of 14 bits, a signal will be obtained which is periodic in 100 µm. In this signal, 1 bit will then correspond to 6.18 nm.

The computing unit now reads the data of the two sensors or sensor systems and generates a new absolute data stream with 28 bits of position data from the combination of data, wherein the lower 14 bits of the incremental measurement system and the upper 14 bits of the absolute measurement system are use and concatenated. The periods of the incremental sensor may be counted in, and the corresponding three data streams (i.e. incremental sensor with period counter, absolute sensor and new output data stream) can be compared to each other in order to create redundancy. At the mutual transition points of the periods, the computing unit, using a corresponding algorithm, provides for the consistency of the data both in the incremental measurement system and in the absolute measurement system.

For the method, the raw data from the two sensor systems are not required to necessarily be in a binary relationship to each other, but this will simplify the calculation of the output data in an FPGA, for example. In case of sensor data being in a non-binary relationship to each other, the method may be applied in an analog manner but will then require to carry out the mutual calculation of the data by means of integers or even by means of floating-point numbers.

FIG. 4 illustrates the synchronization of the position data streams of the two sensor systems in a schematic representation. The magnetic absolute sensor provides absolute position data 402 over its positioning range. These data items are absolute and can be downsampled into position pieces of the length of the second measurement system. One requirement for these data items is to always allow, in relation to the position data 401 of the optical incremental sensor, a clear allocation of the period, in which the incremental sensor is in relation to the absolute position information.

If the mutual relation of the two pieces of information is not correct, a case of failure will occur, since an allocation of the absolute position of the magnetic sensor to the relative position of the incremental sensor might no longer be possible. It may therefore be reasonable to carry out a calibration step when the sensor device is first put into service. Thereby, the phase information of the two measuring units or sensors is compared and matched with each other. The incremental sensor system always provides position data 401 which are periodic in one period 400 of the gauge. At the mutual transition points of the periods, the position value within one period returns from its maximum value within one period to the initial value (e.g. from period ni to n+1). In analogy, there are points in the position data 402 of the absolute sensor system which indicate in each case in which period the sensor system is in, or points, which indicate the transition into the respective next period (e.g. period na to na−1, or na to na+1). These transitions are designated with reference numerals 404 and 405 in FIG. 4.

Reasonably, the periods will be matched to one another such that the artificial periods of the absolute sensor system are exactly aligned to the real periods of the incremental sensor system (e.g. at position 403). In other words, the points, where in each case the transition from one period to the next period takes place, are quasi at the same position. If the pieces of position information of the signals of the two gauges now slightly shift relative to one another, this matching over a larger area ensures that the absolute position signal is always allocated to the correct incremental period.

With respect to position 403, a certain safety distance can now be calculated in which the mutual matching of the periods works reliably. A reasonable distance may in this case be half the period of the incremental measurement system, for example. If this value is exceeded, the overall measurement system, for example, may output a warning signaling that the safety margin has been exhausted.

A shift of the signals relative to one another is influenced by a different linearity of the position signals of the two sensor systems, the absolute accuracy of the magnetic gauge in relation to the optical track, and by thermal influences. Furthermore, it is also required to ensure that the position of the sensors relative to one another shift only minimally by thermal influences.

FIG. 5 shows in portions (a) and (b) different embodiments with respect to the arrangement of the measuring units of the sensor systems as compared to the gauge or gauges of a sensor device according to the invention. Gauge 200 is formed as a hybrid gauge. Its surface layer 201 features a defined structure comprising reflecting and absorbing areas (illustrated by bright and dark stripes) and thus constituting the corresponding optical gauge 220 which can be scanned by the measuring unit of an optical sensor system, i.e. an optical sensor. On the basis of the sectional view illustrated in FIG. 5, the magnetic gauge 203 embedded and concealed in the interior thereof can also be seen, which magnetic gauge 203 comprises numerous North and South poles in a continuous and alternate sequence (illustrated by bright and dark stripes) and may also include magnetic tracks side by side having different periods.

The two measuring units or sensors 101 and 102, which cooperate with the corresponding gauge may be arranged with respect to the hybrid gauge 200 either side by side along the longitudinal extension thereof (portion (b) of FIG. 5) or side by side in the transverse extension thereof (portion (a) of FIG. 5).

LIST OF REFERENCE NUMERALS

101 measuring unit of the magnetic sensor system
102 measuring unit of the optical sensor system
103 processing unit
104 circuit
105 computing unit
106 data stream
200 hybrid gauge
201 surface layer
202 material layer
203 gauge of the magnetic sensor system
204 carrier layer
205 adhesive material
210 gauge body
220 gauge of the optical sensor system
302 carrier element
306 distance of the optical measuring unit from the measurement surface 307 distance of the magnetic measuring unit from the measurement surface
308 common measurement surface
400 periodicity of the signals of the gauge
401 position data of the optical sensor system
402 position data of the magnetic sensor system
403 position with maximum distance to the transition points of the periods of the signals of the two gauges
405 transition point of the period of the signals of the two gauges
405 transition point of the period of the signals of the two gauges

The invention claimed is:

1. A sensor device for detecting measurement data relating to the absolute position of a linearly or rotationally moveable body, comprising:
an optical sensor system having a measuring unit (102) and a gauge (220) cooperating with the measuring unit (102), wherein the optical sensor system uses exclusively zero-order reflections for the position measuring, and the optical sensor system emits a first sensor output signal depending on the position to be determined of the moveable body, and
a magnetic sensor system having a measuring unit (101) and a gauge (203) cooperating with the measuring unit, which emits a second sensor output signal depending on the position to be determined of the moveable body, wherein the gauge (220) of the optical sensor system and the gauge (203) of the magnetic sensor system are integrated in a common gauge body (210), and the measuring unit (102) of the optical sensor system and the measuring unit (101) of the magnetic sensor system are facing the surface of the gauge body (210), on which the gauge (220) of the optical sensor system and/or the gauge (203) of the magnetic sensor system are or is arranged and which defines a measurement surface, and wherein the optical sensor system has a higher resolution than the magnetic sensor system, and
a computing unit (105) which is provided to obtain the first sensor output signal (401) and the second sensor output signal (402) and to generate a common sensor output signal from the first sensor output signal (401) and the second sensor output signal (402), wherein the current period of the optical sensor system can be deduced from the second sensor output signal (402) of the magnetic sensor system at any time, in order to calculate clear absolute position information based on the first and the second sensor output signal,
wherein the accuracy of the magnetic sensor system is less than the signal period of the optical sensor system.

2. The sensor device according to claim 1, characterized in that the gauge (220) of the optical sensor system is arranged in the plane of the common measurement surface (309) of the gauge body (210).

3. The sensor device according to claim 1, characterized in that the gauge (203) of the magnetic sensor system is arranged in a direction facing away from the measuring unit (102) of the optical sensor system and the measuring unit (101) of the magnetic sensor system and spaced from the common measurement surface (309) of the gauge body (210).

4. The sensor device according to claim 1, characterized in that the sensor output signals (402) from the magnetic sensor system are in another digital data format than the sensor output signals (401) from the optical sensor system.

5. The sensor device according to claim 1, characterized in that the geometric dimension of the gauge (220) of the optical sensor system in the direction of its largest extension corresponds essentially to the geometric dimension of the gauge (203) of the magnetic sensor system in the direction of its largest extension.

6. The sensor device according to claim 1, characterized in that the optical sensor system is an incremental sensor system, and the magnetic sensor system is an absolute measuring sensor system.

7. The sensor device according to claim 1, characterized in that the resolution of the sensor unit is identical to the resolution of the optical sensor system.

8. The sensor device according to claim 1, characterized in that the gauge (220) of the optical sensor system has a lattice structure with between 3 and 20 lines per mm.

9. The sensor device according to claim 8, characterized in that the lattice structure is manufactured by means of etching or by laser.

10. The sensor device according to claim 1, characterized in that the thermal expansion coefficient of the material for the gauge (220) of the optical sensor system essentially corresponds to the thermal expansion coefficient of the material for the gauge (203) of the magnetic sensor system.

11. The sensor device according to claim 1, characterized in that the total resolution thereof in a linear position measurement is better than 100 nm and in a rotation position measurement better than 100 μrad.

12. The sensor device according to claim 1, characterized in that the measuring unit (102) of the optical sensor system and/or the measuring unit (101) of the magnetic sensor system are/is realized as an integrated circuit.

13. The sensor device according to claim 1, characterized in that the measurement data items of the sensor unit are transmitted to a higher-order unit in a secured digital data format.

14. A method for detecting measurement data relating to the absolute position of a linearly or rotationally moveable body using a sensor device described above, wherein the sensor output signals (401, 402) of both of the sensor systems are compared with each other in the computing unit (105) in order to achieve increased redundancy and to generate a warning in the event of a fault.

15. The method according to claim 14, characterized in that the sensor device synchronously reads the sensor output signals (401, 402) from both of the sensor systems and calculates therefrom position measurement data of higher resolution, which are kept ready for a subsequent unit reading out the position measurement data, wherein the retrieval of the position measurement data of higher resolution by the reading unit is performed asynchronously to the calculation thereof.

16. The method according to claim 15, characterized in that the position measurement data is first requested by the reading unit, and subsequently the computing unit (102) of both of the sensor systems requests synchronously the respective position measurement data and calculates new position information from both of the position measurement data, and the new position information is then sent back to the reading unit.

* * * * *